United States Patent
Malley et al.

(10) Patent No.: US 9,482,306 B2
(45) Date of Patent: Nov. 1, 2016

(54) TORSION DAMPING DEVICE WITH SPRINGS AND TILTING SEATS

(71) Applicant: VALEO EMBRAYAGES, Amiens (FR)

(72) Inventors: Matthieu Malley, Beauvais (FR);
Laurent Caumartin, Beauquesne (FR);
Adrien Nerriere, Amiens (FR)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 14/429,446

(22) PCT Filed: Sep. 23, 2013

(86) PCT No.: PCT/FR2013/052216
§ 371 (c)(1),
(2) Date: Mar. 19, 2015

(87) PCT Pub. No.: WO2014/053733
PCT Pub. Date: Apr. 10, 2014

(65) Prior Publication Data
US 2015/0247552 A1    Sep. 3, 2015

(30) Foreign Application Priority Data
Oct. 4, 2012  (FR) ..................................... 12 59438

(51) Int. Cl.
| | |
|---|---|
| *F16F 15/123* | (2006.01) |
| *F16F 15/134* | (2006.01) |
| *F16D 3/66* | (2006.01) |
| *F16D 13/58* | (2006.01) |

(52) U.S. Cl.
CPC ........... *F16F 15/13438* (2013.01); *F16D 3/66* (2013.01); *F16D 13/58* (2013.01); *F16D 2300/22* (2013.01)

(58) Field of Classification Search
CPC ...... F16F 15/13438; F16F 3/66; F16F 15/58; F16F 2300/22
USPC ............... 464/66.1, 68.92; 192/205; 267/172
See application file for complete search history.

(56) References Cited

U.S. PATENT DOCUMENTS

| | | | | |
|---|---|---|---|---|
| 902,523 | A | * | 10/1908 | Dalton ...................... F16D 3/66 464/66.1 |
| 2,436,248 | A | * | 2/1948 | Cardillo .................... F16D 3/66 464/66.1 |

FOREIGN PATENT DOCUMENTS

| | | |
|---|---|---|
| EP | 0258112 | 3/1988 |
| FR | 2571461 | 4/1986 |
| FR | 2732426 | 10/1996 |
| FR | 2 875 882 A1 * | 3/2006 |
| FR | 2875882 | 3/2006 |

* cited by examiner

*Primary Examiner* — Gregory Binda
(74) *Attorney, Agent, or Firm* — Berenato & White, LLC

(57) ABSTRACT

This device comprises two coaxial elements mounted rotatably with respect to a spring, and two seats for positioning the spring. Each seat comprises a dorsal pivot projection configured in two coaxial elements. The pivot projection is delimited by a cylinder portion whose section is a first circular arc whose tangent forms an angle α with the axis of the spring. The section of each receptacle is formed by a second circular arc, having the same center and radius of curvature as the first circular arc, the tangent of which forms with the axis of the spring an angle γ greater than α. The pivot axes are parallel to one another at a distance L, and are included in a plane located at a distance R from the rotation axis. The maximum deflection angle of the device is δ. γ is within the range [arctg(L/2R)−δ/8 to arctg(L/2R+δ].

21 Claims, 5 Drawing Sheets

TORSION DAMPING DEVICE WITH SPRINGS AND TILTING SEATS

CROSS-REFERENCE TO RELATED APPLICATIONS AND CLAIM TO PRIORITY

This application is a national stage application of International Application No. PCT/FR2013/052216 filed Sep. 23, 2013, which claims priority to French Patent Application No. 1259438 filed Oct. 4, 2012, of which the disclosures are incorporated herein by reference and to which priority is claimed.

The present invention relates to a torsion damping device of the kind having two coaxial parts mounted rotatably with respect to one another against springs interposed circumferentially between them.

BACKGROUND OF THE INVENTION

A torsion damper device of this kind is utilized in particular in the construction of a friction clutch, in particular for a motor vehicle, or in that of a flywheel for such a motor vehicle, then usually called a "dual mass flywheel."

The invention is aimed more particularly at the situation in which a seat is interposed circumferentially between each of the ends of at least one of the springs, and on the other hand between one and the other of the coaxial parts, a frontal part of said seat ensuring abutment and/or centering of at least one such spring and said seat itself abutting, with a dorsal part, against one and/or the other of the coaxial parts, by being mounted pivotingly with respect to the latter around an axis parallel to their own rotation axis.

A device of this kind is described in particular in the documents FR 2 732 426 and EP-A-0 258 112.

Because they are pivotingly mounted, the seats against which the springs abut, sometimes called "cups," allow said springs to work under good conditions during operation, even at full torque, while typically retaining a certain parallelism between their ends.

They are generally made of steel, typically of cast steel, and can optionally serve to support caps made of elastic or plastic material that, interposed in the manner of full-torque stops, advantageously allow good energy distribution within the springs before the turns of at least some of them become contiguous. They can also be constituted entirely from elastic or plastic material, and can be manufactured in particular by molding.

Lastly, they advantageously prevent centrifugation of the springs. This anti-centrifugation effect is generally of only limited effectiveness, however, since the seats themselves can be ejected from their receptacles.

The document FR 2 875 882 has furthermore already described a torsion damping device comprising seats for springs whose pivot axis is offset with respect to a dorsal face of the seat in order to improve the operation of said seat in particular in terms of the risk of ejection from the receptacles. Each seat comprises a dorsal pivot projection able to pivot in two receptacles configured in the two coaxial elements, the pivot projection being delimited in particular by a cylindrical portion having a section formed by a first circular arc whose tangents at the ends of said arc form a first acute angle. The section of the corresponding part of each receptacle is formed by a second circular arc, having the same center and radius of curvature as the first circular arc, the tangents of which at the ends of said arc form a second acute angle greater than the first acute angle. The pivot axes of the two projections are mutually parallel at a distance L between them, and are included in a plane located at a distance R from the rotation axis. Each pivot axis is offset by a value d, toward the exterior of the spring, with respect to the planar face of the corresponding seat.

Although this technology yields good results at moderate or average speeds, it has nevertheless been found that it did not allow operating problems at high output, such as ejection of the seats from their receptacles and/or impacts with said receptacles, to be solved

SUMMARY OF THE INVENTION

The purpose of the invention is in particular to obtain satisfactory operation of the seats of a spring-type torsion damper, including at high output.

To this end, the object of the invention is a torsion damping device of the kind comprising two coaxial elements mounted rotatably with respect to one another around a rotation axis against at least one spring interposed circumferentially between them, and two seats for positioning the ends of said spring,
in which device:
for each seat, with no rotation-speed loads or torque loads:
  said seat comprises a frontal part for abutment and/or centering of one end of the spring, and a dorsal part having an axial pivot projection able to pivot around a pivot axis parallel to the rotation axis in two pivot receptacles associated with said projection, configured respectively in one and on the other of the two coaxial elements;
  the axial pivot projection is delimited by a supporting surface formed in part by a cylinder portion of circular section intended to come into contact with a corresponding part of a complementary supporting surface of each pivot receptacle associated with the projection;
    the section of the cylinder portion is formed by a first circular arc whose tangent at a radially outer end of said arc forms, with an axis of the spring, an acute angle having a value $\alpha$ pertinent to that seat;
    the section of the corresponding part of the complementary supporting surface of each receptacle is formed by a second circular arc pertinent to that seat, having substantially the same center and a radius of curvature substantially identical to that of the first circular arc, a tangent of which at a radially outer end of said arc forms with the axis of the spring an acute angle $\gamma$ pertinent to that receptacle and greater than $\alpha$, where $\gamma = \alpha + \mu$;
  in which device, with no rotation-speed loads or torque loads: the pivot axes corresponding to the projections of the two seats each pass through the center of a first circular arc, are substantially equidistant from the rotation axis, parallel to one another at a distance L between one another, and are included in a plane located at a distance R from the rotation axis;
wherein for at least one of the two seats, called the "first seat," the angle $\gamma$ pertinent to each receptacle associated with the projection of said first seat is within the range [arctg(L/2R)−δ/8 to arctg(L/2R+δ)], preferably the range [arctg(L/2R)−δ/12 to arctg(L/2R+0.5 δ)], and very preferably is substantially equal to arctg(L/2R), in which δ represents the maximum deflection angle of the damping device between a position with no rotation-speed loads or torque loads and a position at a stop in response to a total torque transmitted by the engine.

It has been found, specifically, that with this particular relationship among $\gamma$, $\delta$, L, and R it is possible to avoid ejection of the seats from their receptacles at high output, typically at engine rotation speeds greater than or equal to 1200 revolutions per minute.

L is the distance between the centers of rotation of the two projections, considered when the device is in a rest state, with no rotation-speed load (no centrifugal forces) or torque loads, when each projection is in typically cylindrical contact with the bottom of its receptacle; and R is the distance from the plane containing the pivot axes to the rotation axis.

Considering the angle $\phi$ between the centers of rotation of the two projections, proceeding from the rotation axis in a plane perpendicular to said rotation axis (this angle represents the angular opening of the damper), then $\delta$, which represents the maximum deflection angle of the damper, is equal to the change in the angular opening $\phi$ of the damper between a position with no rotation-speed loads or torque loads and a position at a stop in response to a total torque exerted by the engine. This stop can be a physical stop separate from the spring, or the spring itself whose turns become contiguous when the opening of the damper has decreased to the value $\delta$, namely the maximum deflection angle of this damper (where the term "damper" designates the torsion damping device).

The above condition also makes it possible to prevent or greatly limit impacts between a seat and the receptacles associated with that seat, since a seat typically detaches from the receptacle of one of the two coaxial elements during operation under torsion loads.

A particularly well-adapted angle $\gamma$ is therefore typically close to or equal to: $\gamma=\text{arctg}(L/2R)$.

When R (which typically corresponds to the distance from the axis of the spring (in a neutral position with no rotation) to the rotation axis of the device) is large, the value of $L/2R$ is relatively small, and therefore so is the value of $\text{arctg}(L/2R)$, which means that $\alpha+\mu$, and thus the angles $\alpha$ and $\mu$, must be relatively small. It is evident therefrom that the opening angles of the seat ($\alpha$) and of the receptacles ($\alpha+\mu$) with respect to the axis of the spring must then be relatively small. This expresses the technical effect such that when the spring is far away from the rotation axis, the opening angles of the seats and of the receptacles must be relatively closed (small) in order to retain the seats in their receptacles at a high engine speed.

Conversely, when the spring is relatively close to the rotation axis, the centrifugal force exerted on it is less and it turns out that the opening angles of the seats and receptacles which are best adapted to such a configuration can be larger.

The relationship among $\gamma$, $\delta$, L, and R thus defines a range of optimum dimensions to prevent both spring ejection and seat/receptacle impacts.

Preferably the angle $\gamma$ is within the range [arctg(L/2R)−$\delta$/12 to arctg(L/2R)+0.5 $\delta$].

Advantageously, $\gamma$ could also be selected to be within the range [arctg(L/2R)−4° to arctg(L/2R)+20°], or within the range [arctg(L/2R)−3° to arctg(L/2R)+15°], or preferably within the range [arctg(L/2R)−2° to arctg(L/2R)+10°] or even within the range [arctg(L/2R)−1° to arctg(L/2R)+5°].

Advantageously, the angle $\gamma$ pertinent to each of the receptacles associated with the projection of the first seat, and preferably pertinent to each of the receptacles associated with the projection of any one of the two seats, is within the range [$\alpha$+0.375 $\delta$ to $\alpha$+$\delta$], and preferably within the range [$\alpha$+0.44 $\delta$ to $\alpha$+0.80 $\delta$].

Preferably the angle $\gamma$ pertinent to each of the receptacles associated with the projection of the first seat, and preferably pertinent to each of the receptacles associated with the projection of any one of the two seats, is substantially equal to $\alpha$+0.5$\delta$.

Each of the receptacles of each of the seats is thus adapted to that seat in terms of its angular opening.

The complementary supporting surfaces of the two pivot receptacles associated with the projection of a seat advantageously have the same configuration, i.e. have sections comprising an identical second circular arc whose tangents at the ends form the same angle $\gamma$ conforming to the relationship above. The two complementary supporting surfaces can, however, have slightly different geometries, expressed as different angles $\gamma$ and $\mu$ for the two receptacles associated with the same protrusion of a seat, the aforesaid angular relationship being conformed to for each of the two receptacles.

Similarly, the two seats generally have identical geometries with identical angles $\alpha$. Without departing from the framework of the invention, however, each seat with its associated pivot receptacles can have a geometry different from that of the other seat, such that each seat, with its pertinent opening angle $\alpha$ and the opening angles ($\gamma=\alpha+\mu$) of its associated receptacles, conforms to the aforementioned relationship.

Preferably the angle $\alpha$ is identical for each of the two seats, and the angle $\gamma$ pertinent to each receptacle is identical for each of the receptacles. In this case there is therefore no more than a single angle $\alpha$ and a single angle $\gamma=\alpha+\mu$, and thus also a single angle $\mu$ for the two seats and all of the associated receptacles.

Advantageously, the section of the supporting surface of the projection comprises the first circular arc extended by a tangential segment at each of its ends, and the second of the complementary supporting surface of each pivot receptacle associated with the projection comprises the second circular arc extended by a tangential segment at each of its ends.

The dorsal part of at least one seat (and preferably of both seats) advantageously comprises a radially outer planar dorsal face circumferentially facing a matching radially outer planar face of each of the two coaxial elements, these matching radially outer planar faces being configured so as not to interfere with pivoting due to rotation of the seat through an angle at least equal to $\mu$, and preferably at least equal to 1.5$\mu$, and preferably at least equal to 2$\mu$.

The pivot receptacles and the relative configuration of the seat and axial element thus allow considerable angular deflection of the seat while preventing direct impacts between the seat and axial element even in particular, i.e. extreme, operating instances.

The term "radially outer" means: disposed radially outward with respect to a plane passing through the pivot axes of the two projections.

Typically the radially outer planar dorsal face forms, with each of the matching radially external planar faces, an angle $\beta$ at least equal to 1.5$\mu$, and preferably at least equal to 2$\mu$.

Preferably the common center of the first and second circular arcs is offset circumferentially toward the outside of the spring, with respect to the plane of the radially outer planar dorsal face, by a value d1 that is, for example, between 1 mm (millimeter) and 6 mm.

In practice, the first and the second circular arc can have very slightly different centers, e.g. spaced apart from one another by at most 0.3 mm and preferably at most 0.2 mm. A tolerance can also exist, for example of at most 0.3 mm and preferably at most 0.2 mm, between the radii of these circular arcs, the radius of the first circular arc (corresponding to the seat) then being preferably slightly smaller than the radius of the second circular arc (corresponding to a receptacle).

Typically the shortest distance d2, from the radially outer planar dorsal face of the seat to a part of a coaxial element circumferentially facing said planar dorsal face, is between 0.2 mm and d/12.

Typically each coaxial element comprises two edges, each one circumferentially facing a radially outer part of a seat, which are configured so that each of the two seats can pivot through an angle at least equal to μ, the pivoting of a seat being in a direction opposite to that of the other seat in order to allow bending of the spring with radial outward displacement of a central part of said spring in response to centrifugal forces.

Each of the seats is generally made of steel, typically cast, or of plastic material, preferably by molding, and preferably comprises a central recess arranged in its frontal part.

The axial length of the projection is generally substantially equal to the distance between two outer faces belonging respectively to one and to the other of the two coaxial elements.

In general, a torsion damping device according to the present invention comprises a plurality of circumferentially acting springs, for example four to six springs of a given type, distributed circumferentially. In general, each pair of seats ensures the positioning of several springs, for example two or three springs nested inside one another, having different turn diameters. The device can also comprise springs configured to damp at a high torsional torque, and other springs configured to damp at a low torsional torque. Advantageously, the seats of these various springs and their associated receptacles each conform to the aforementioned relationship.

The invention likewise relates to a friction clutch for a motor vehicle, comprising the aforementioned torsion damping device.

The invention also relates to a dual mass flywheel for a motor vehicle, comprising one flywheel integral with a driving shaft and one flywheel integral with a driven shaft, in which the two masses are the two coaxial elements of the aforementioned torsion damping device.

In general, each of the coaxial elements can comprise a single element shaped integrally from a plate, but also several elements integral with one another. A coaxial element can in particular comprise two radial parts each comprising a disk and integral with one another, sometimes called "guide washers," arranged on either side of the other coaxial element, sometimes called a "web." This assemblage can typically be part of a clutch or of a dual mass flywheel.

The device can also comprise more than two coaxial elements mounted rotatably around a single axis, for example three or four elements or more.

Lastly, the invention relates to a single, double, or multiple clutch for a motor vehicle, comprising at least one torsion damping device such as the one recited above.

BRIEF DESCRIPTION OF THE DRAWINGS

The invention will be better understood upon reading the description that follows, provided exclusively as an example and referring to the drawing of FIG. 1, which is a front view of a dual mass flywheel 1 with a torsion damping device for a motor vehicle, FIG. 2, which is a side sectional view taken along section line 2-2 of FIG. 1, and FIG. 3, which is a partial axial view of the torsion damping device according to the invention, depicted at rest.

Also.

DETAILED DESCRIPTION

Figure 1:
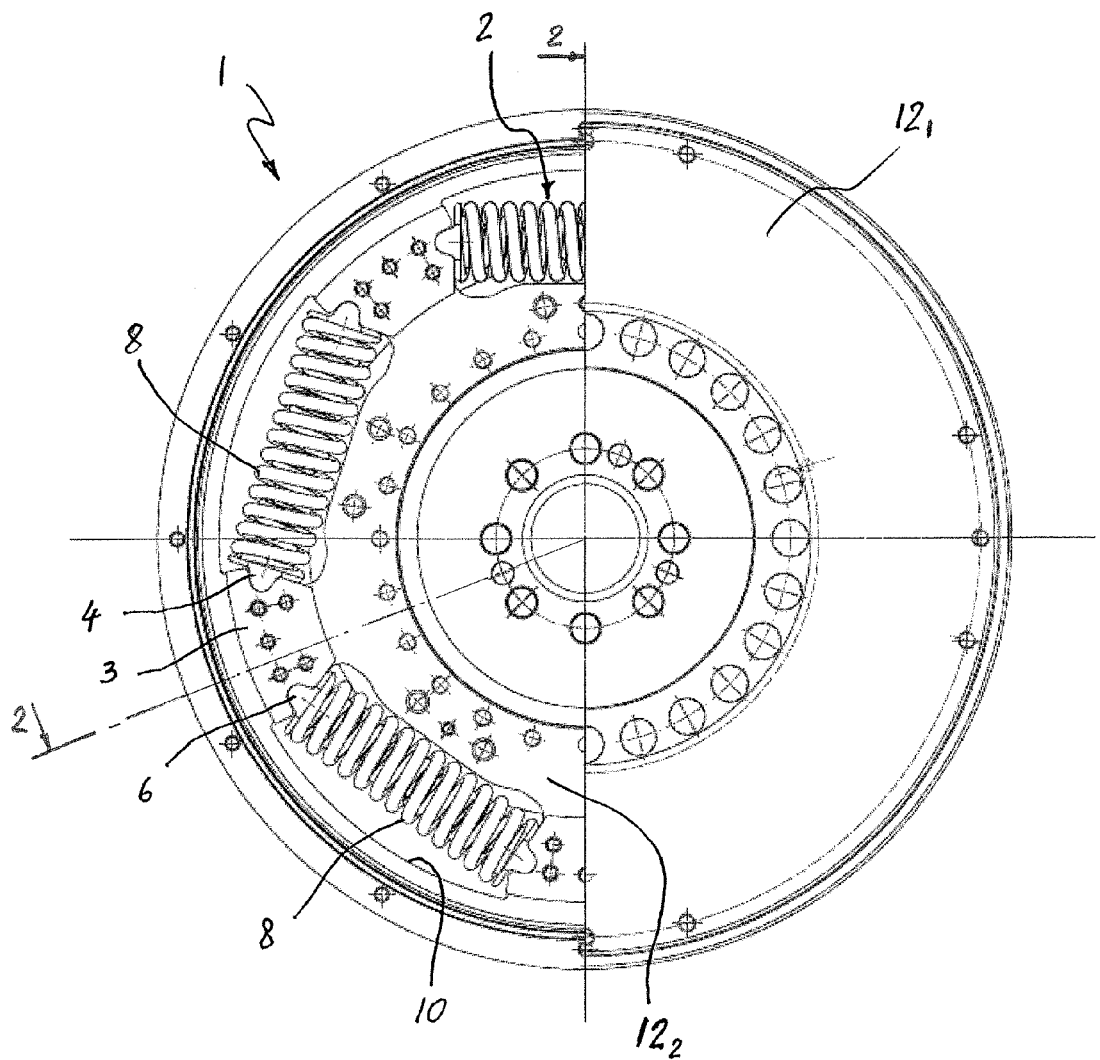
Figure 2:
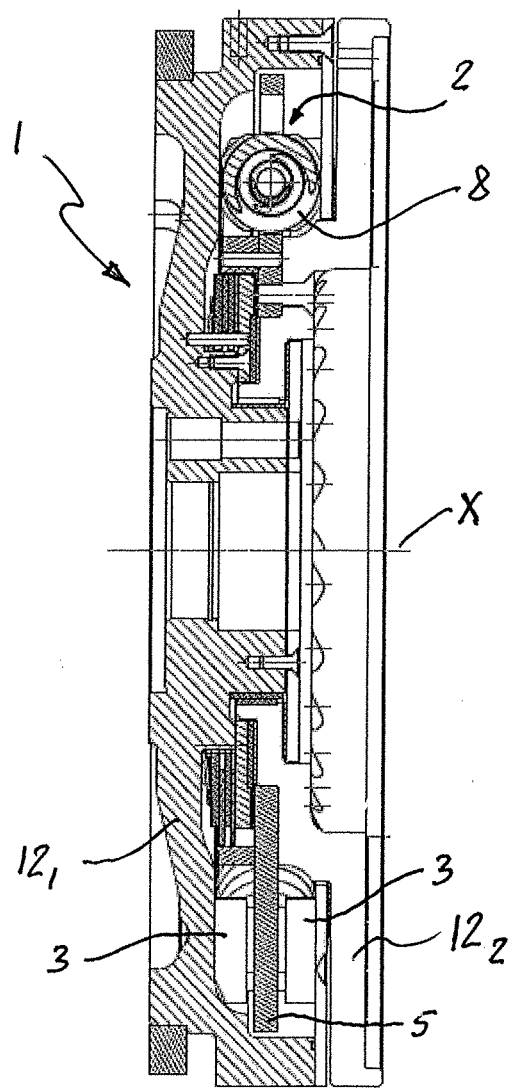
Figure 3:
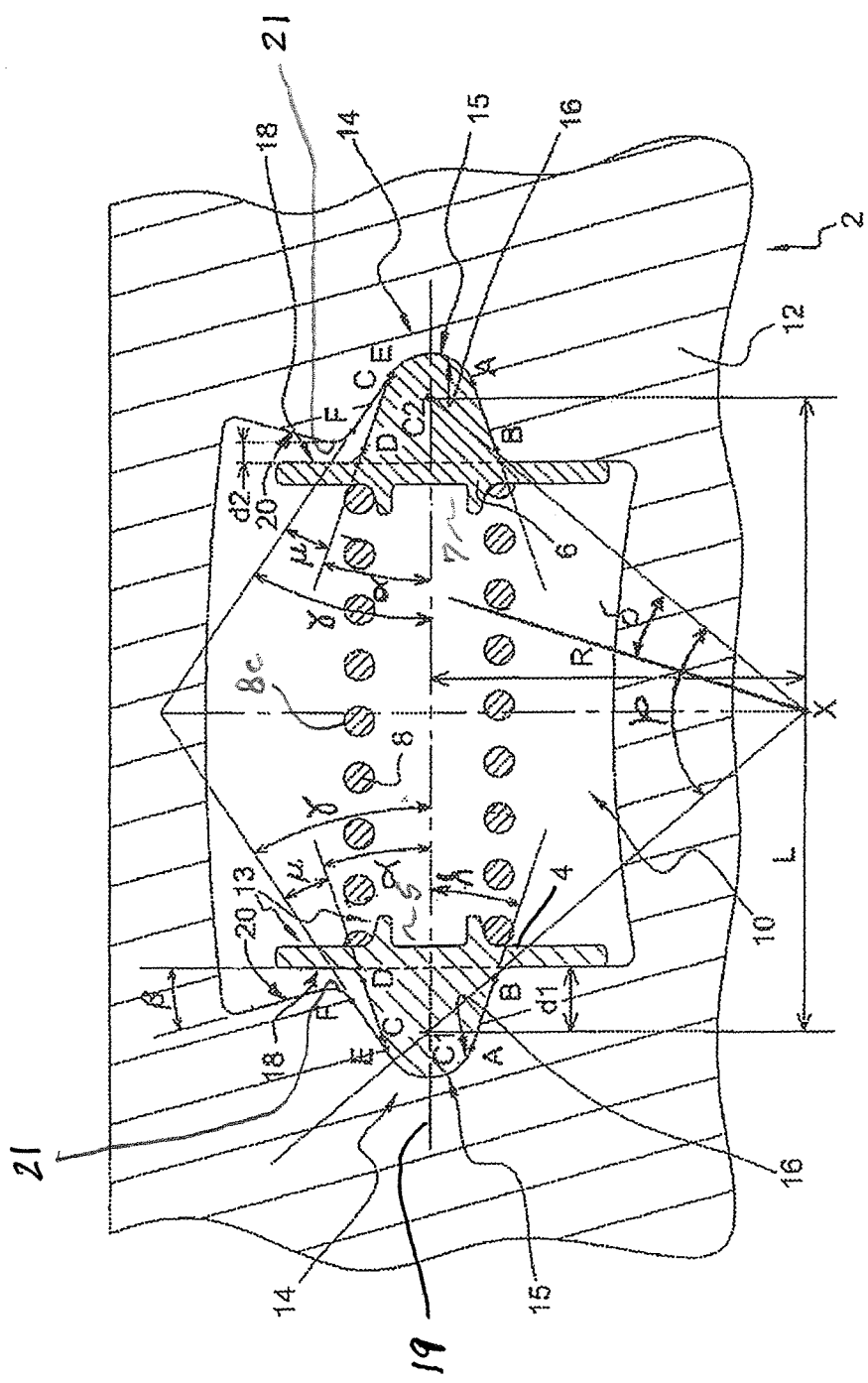

FIGS. 1-3 thus depicts part of a torsion damping device 2 of a dual mass flywheel 1, depicted in a position with no rotation-speed loads or torque loads in FIGS. 1 and 2. The dual mass flywheel 1 has a first damping flywheel $12_1$, or primary flywheel, serving as an input element to the device, and a second damping flywheel $12_2$, or secondary flywheel serving as an output element of the device. The two damping flywheel $12_1$ and $12_2$ are mounted coaxial relative to each other about an axis of rotation X of the dual mass flywheel 1. In the interest of simplicity, the following discussion will sometimes use the reference numeral [12] when generically referring to the damping flywheels $12_1$ and $12_2$. The dual mass flywheel 1 further comprises guide elements 3 fixed to the first damping flywheel $12_k$, and a web 5 connected to the secondary damping flywheel $12_2$. The two damping flywheels $12_1$ and $12_2$ are mounted rotatably relative to the other against the action of the springs 8 as well as interfacing means. The torsion damping device 2, comprises two spring seats 4 and 6 for positioning and centering a circumferentially acting, typically helical, spring 8. Each of the seats 4 and 6 is generally made of steel, typically cast, or of plastic material, preferably by molding, and preferably comprises a central recess 5 and 7, respectively, arranged in its frontal part. The spring 8 and the two seats 4 and 6 are arranged in a first window 10 of a first coaxial element defined by the first damping flywheel $12_1$. This spring 8 and these two spring seats 4 and 6 are likewise arranged in a second window belonging to a second coaxial element defined by the web 5 connected to the second damping flywheel $12_2$. This second window may have the same geometry as the first window and is not depicted in FIG. 3. The second coaxial element $12_2$ that is typically arranged behind the first coaxial element $12_1$.

Each seat 4, 6 comprises a frontal part 13 for positioning and centering spring 8, and a dorsal part comprising an axial projection 14 delimited by a cylinder portion of circular section whose section forms a first circular arc 15 between points A and C. Each end A, C of the first circular arc of a seat is extended tangentially by a tangential segment respectively AB and CD, these two tangential segments belonging to the section of the supporting surface of the projection.

The pivot projection 14 is thus delimited by a supporting surface partly constituted by a cylinder portion of circular section, and partly constituted by planar parts whose section is represented by the profile DCAB intended to come into contact with a corresponding part of a complementary supporting surface of each pivot receptacle associated with the projection. This complementary supporting surface is depicted in FIG. 3 by its section, along the profile FEAB, which comprises a second circular arc 16, between the geometrical points A and E, of the same curvature as the first circular arc and in part substantially identical to said first circular arc, extended tangentially at its ends A and E by tangential segments AB and EF.

An axis 19 of the (helical) spring 8 is in fact, and conventionally, the straight line connecting centers C1 and C2 of the first circular arcs corresponding to the two seats.

The tangent to the radially outer end C of each first circular arc (for each seat) forms an angle α with the axis 19 of the spring 8.

The other tangent, to the radially inner end A of each first circular arc (for each seat) forms an angle λ with the axis of the spring. The angles α and λ are generally the same, the projection being arranged in equally distributed fashion on either side of the axis connecting centers C1 and C2 of the first circular arcs of each seat (or axis of spring 8).

The opening angle γ, with respect to the axis of spring 8, of the receptacle configured in first coaxial element 12 in order to receive the pivot projection is nevertheless greater by an angle μ than the opening angle α of the projection: γ=α+μ.

The angle μ thus permits an angular deflection of the pivot projection of the seat in the associated pivot receptacle. Pivot axes of the axial pivot projections 14 of the two seats 4, 6 pass respectively through the centers C1 and C2. Each of the axial pivot projections 14 is configured to pivot around the pivot axis parallel to the rotation axis in two pivot receptacles associated with the axial pivot projection 14, configured in the two coaxial elements 12. Each of the pivot axes corresponding to the axial pivot projections 14 of the two seats 4, 6 pass through the center C1, C2 of a first circular arc. The pivot axes are substantially equidistant from the rotation axis parallel to one another at a distance L between one another, and are included in a plane located at a distance R from the rotation axis, as best shown in FIG. 1.

The dorsal part of each seat likewise comprises a radially outer dorsal face 18, circumferentially facing a matching radially outer face 20 typically of each of the two coaxial elements 12, these matching radially external faces being configured not to prevent rotation of a seat through an angle at least equal to μ, preferably at least equal to 1.5μ, and very preferably at least equal to 2μ.

Radially outer dorsal face 18 and matching radially outer face 20 form an angle β at least equal to μ, and preferably at least equal to 1.5μ, and preferably at least equal to 2μ, with the radially outer planar dorsal face of the seat in order to permit pivoting of said seat with an angular displacement β that provides a safety margin for particular atypical functioning modes. The angle β between the two matching planar faces 18 and 20 is thus advantageously appreciably greater than or equal to μ, preferably at least equal to 1.5μ, and very preferably at least equal to 2μ. It has been found that such angular deflection values allow impacts between the seat and the lateral edges of window 10 to be avoided.

The pivot receptacle is that part of the surface of first coaxial element 12 which is located facing toward projection 14, the section of which comprises second circular arc 16, AE, and the tangential end segments AB and EF. It corresponds to the contour BAEF.

The common center, respectively C1, C2, of each first circular arc 15 and second circular arc 16 of a projection 14 of a seat, respectively 4 and 6, is advantageously decentered toward the outside of the spring by a value d1 with respect to planar face 20.

In order to allow seat 4, 6 to pivot, the smallest distance d2 from radially outer planar dorsal face 18 to a part of coaxial element 12 circumferentially facing said planar dorsal face 18 is not zero, and is typically between 0.2 mm and d/12.

Each coaxial element 12 comprises two edges 21 (radially beyond point F in FIG. 3), each circumferentially facing the seat 4, 6. The edges 21 being configured so that each of the two seats 4, 6 can pivot through an angle at least equal to μ, the pivoting of one seat being in a direction opposite to that of the other seat in order to allow bending of the spring 8 with radial outward displacement of a circumferentially central part of the spring 8 in response to centrifugal forces.

The matching radially outer surfaces of each of the two coaxial elements are thus configured so that each of the seats can pivot through an angle at least equal to μ, the pivoting of each of the two seats being in an opposite direction and allowing bending of spring 8 with radial outward displacement of a central part of said spring 8 in response to centrifugal forces.

At rest, i.e. with no rotation-speed loads or torque loads, the radially inner part of the supporting surface of the seat is substantially in contact with the complementary supporting surface of the receptacle, in particular at segment AB. This is not obligatory, however, since the receptacle can also have an opening angle, in part radially internal, that is greater than that of the seat. The same may also be true of two matching radially inner planar faces that belong respectively to the seat and to the first coaxial element (typically to each coaxial element) but are not part of the pivot projection or of the pivot seat, for example substantially radial faces located in the plane of radially outer face 18 of the seat. It is nevertheless advantageously possible to provide a minimum clearance between a radially inner planar face of this kind of the seat and a matching radially inner planar face of this kind of each coaxial element which are not supporting surfaces.

When the damping device is in a state with no rotation-speed loads or torque loads, the (acute) opening angle of the damping device is constituted by the straight lines XC1 and XC2. These lines connect the point X of the rotation axis (situated at a distance R from the plane passing through the two parallel axes that pass through centers C1 and C2, which are a length L apart from one another) respectively to centers C1, C2, as depicted by reference φ in FIG. 1.

When the damping device is in a state with a large rotational load, the effect of centrifugal force is exerted on seats 4, 6 and on spring 8, the central part of which begins to decenter, and the two seats tend to pivot antagonistically (in opposite directions). In addition, because of torsional torques exerted in a dynamic context on the two coaxial elements, and given their inherent inertia, the spring is caused to compress as the angular deflection of the damper decreases. The damper then retransmits, in damped fashion, the torque exerted on one of the coaxial elements to the other coaxial element. With a large differential torque exerted on the coaxial elements, the opening angle of the damping device becomes greatly reduced, until the damping device comes to a stop (physical stop between seat(s) and receptacle(s), or spring 8 compressed to the point where the turns become contiguous). In FIG. 1 it is assumed that the left seat remained fixed and the right seat came closer to the left seat, the opening angle φ of the device decreasing by an angle δ that designates the maximum deflection angle of the damping device. At this maximum deflection angle, the straight line XC2 has pivoted through the angle δ and the opening angle of the damping device has become reduced and is equal to φ−δ. Concurrently, the two seats pivot with respect to one another.

It has been found that when the device is designed so that the angle γ has a value within the range [arctg(L/2R)−δ/8 to arctg(L/2R+δ], the seats do not come out of their receptacles and impacts between the seats and receptacle are weak or absent. The closer the angle γ is to arctg(L/2R), the higher the rotation speed of the device (and correlatively the higher the engine speed, which is typically identical if there is no demultiplication device) that is usable with no risk of ejecting the seats from their receptacles, or of seat/receptacle impacts. It has also been found that it was desirable for the angle γ to be within the range [α+0.375δ to α+δ], and advantageously to be as close as possible to the value α+0.5δ.

Figure 4:
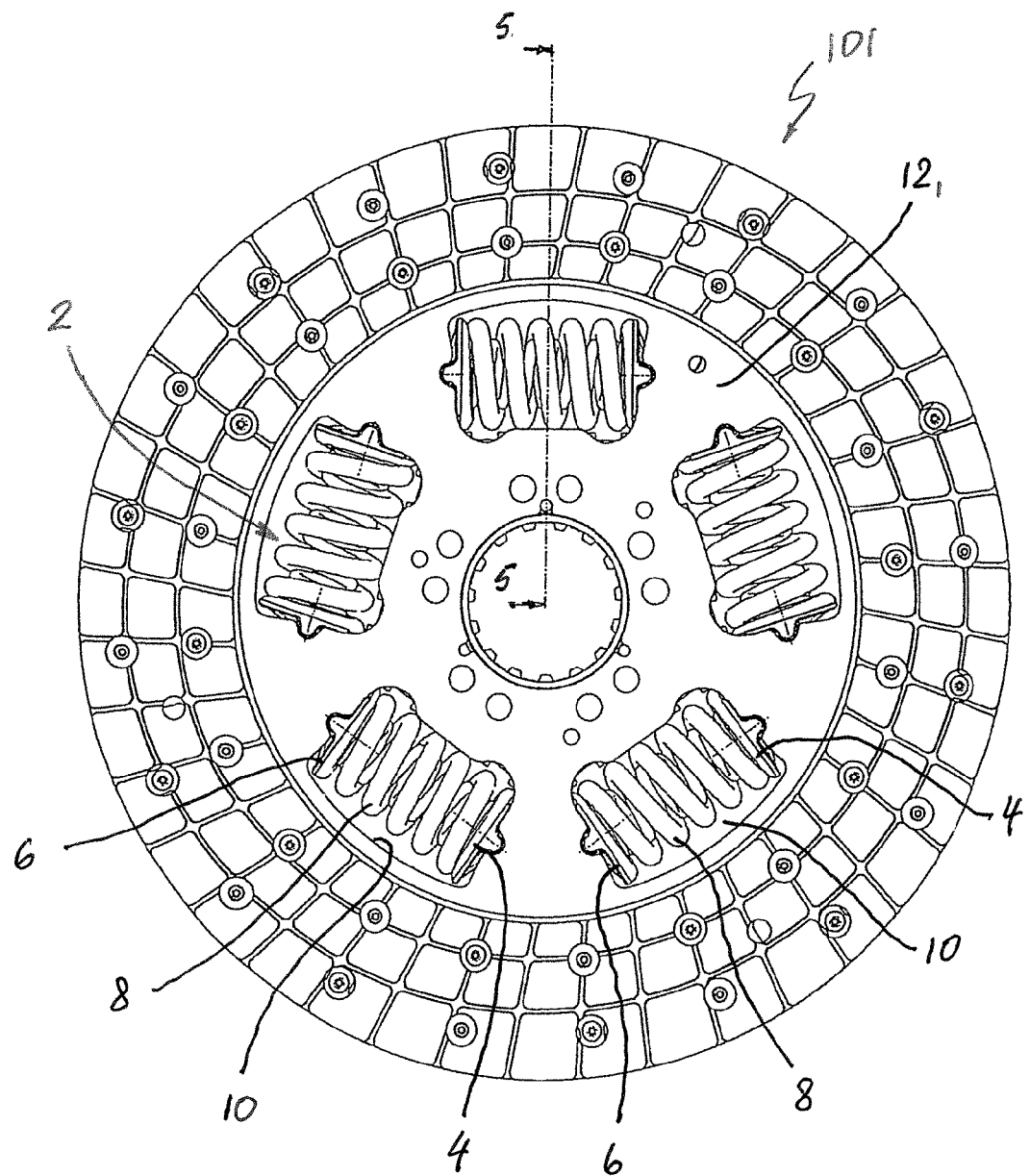
FIG. 4 shows a front view of a friction clutch for a motor vehicle with a torsion damping device.
Figure 5:
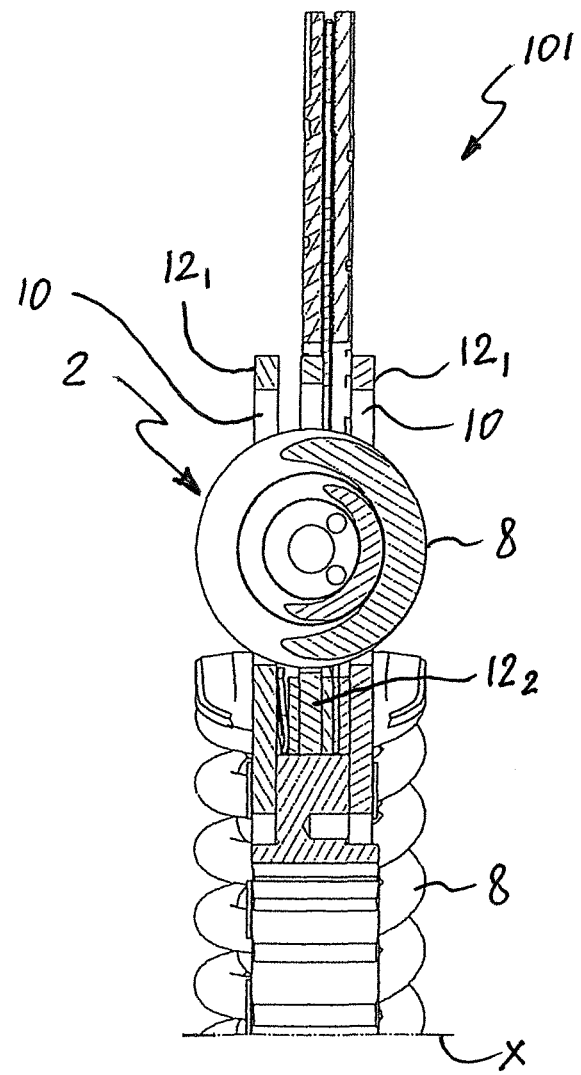
FIG. 5 shows a side sectional view taken along section line 5-5 of FIG. 4.

One skilled in the art will be able, without departing from the framework of the invention, to implement this invention in accordance with embodiments different from those described above, and for example will be able to utilize any technical characteristic that is known from the existing art and is compatible with the invention. For example, the torsion damper device 2 of this invention may be utilized in a friction clutch 101, in particular for a motor vehicle, as shown in FIGS. 4 and 5.

The invention claimed is:

1. A torsion damping device (2) including:
two coaxial elements (12) mounted rotatably with respect to one another around a rotation axis against at least one spring (8) interposed circumferentially between the two coaxial elements (12); and
two seats (4, 6) for positioning ends of the at least one spring (8);
each of the seats comprises a frontal part (13) for at least abutment or centering of one end of the at least one spring (8), and a dorsal part having an axial pivot projection (14) configured to pivot around a pivot axis parallel to the rotation axis in two pivot receptacles associated with the axial pivot projection (14), configured in the two coaxial elements (12);
the axial pivot projection (14) is delimited by a supporting surface formed in part by a cylinder portion of a circular section configured to come into contact with a corresponding part of a complementary supporting surface of each pivot receptacle associated with the axial pivot projection (14);
the circular section of the cylinder portion is formed by a first circular arc (15, AC) whose tangent at a radially outer end (C) of the arc (15, AC) forms, with an axis (19) of the at least one spring, an acute angle having a value α pertinent to the seat (4, 6);
the section of the corresponding part of the complementary supporting surface of each of the pivot receptacles is formed by a second circular arc (16, AE) pertinent to the seat, having substantially the same center and a radius of curvature substantially identical to that of the first circular arc (15), a tangent of which at a radially outer end (E) of the arc forms with the axis (19) of the at least one spring (8) an acute angle γ pertinent to the pivot receptacle and greater than α by an acute angle μ, such that γ=α+μ;
each of the pivot axes pass through a center (C1, C2) of a first circular arc, the pivot axes are substantially equidistant from the rotation axis, parallel to one another at a distance L between one another, and are included in a plane located at a distance R from the rotation axis;
wherein for at least one of the two seats (4, 6) the angle γ pertinent to each pivot receptacle associated with the projection of the at least one of the two seats is within the range [arctg(L/2R)−δ/8 to arctg(L/2R+δ], wherein δ represents the maximum deflection angle of the torsion damping device between a position with no rotation-speed loads or torque loads and a position at a stop in response to a total torque transmitted by the torsion damping device (2).

2. The device according to claim 1, wherein the angle γ pertinent to each of the receptacles associated with the projection of any one of the two seats, is within the range [α+0.375δ to α+δ].

3. The device according to claim 2, wherein the angle γ pertinent to each of the receptacles associated with the projection of any one of the two seats, is substantially equal to α+0.5δ.

4. The device according to claim 2, wherein the angle γ pertinent to each receptacle associated with the projection of each of the two seats (4, 6) is within the range [arctg(L/2R)−δ/8 to arctg(L/2R+δ].

5. The device according to claim 2, wherein the angle α is identical for each of the two seats (4, 6) and the angle γ pertinent to each receptacle is identical for each of the receptacles and each of the seats.

6. The device according to claim 1, wherein the angle γ pertinent to each of the receptacles associated with the projection of the first seat, and pertinent to each of the receptacles associated with the projection of any one of the two seats, is substantially equal to α+0.5δ.

7. The device according to claim 6, wherein the angle γ pertinent to each receptacle associated with the projection of each of the two seats (4, 6) is within the range [arctg(L/2R)−δ/8 to arctg(L/2R+δ].

8. The device according to claim 6, wherein the angle α is identical for each of the two seats (4, 6) and the angle γ pertinent to each receptacle is identical for each of the receptacles and each of the seats.

9. The device according to claim 1, wherein for each of the two seats (4, 6), the angle γ pertinent to each receptacle associated with the projection of that seat is within the range [arctg(L/2R)−δ/8 to arctg(L/2R+δ].

10. The device according to claim 9, wherein the angle α is identical for each of the two seats (4, 6) and the angle γ pertinent to each receptacle is identical for each of the receptacles and each of the seats.

11. The device according to claim 1, wherein the angle α is identical for each of the two seats (4, 6) and the angle γ pertinent to each receptacle is identical for each of the receptacles and each of the seats.

12. The device according to claim 1, wherein the dorsal part of at least the first seat comprises a radially outer planar dorsal face (18) circumferentially facing a matching radially outer planar face (20) of each of the two coaxial elements (12), the matching radially outer planar faces (20) being configured so as not to prevent a rotation of the seat through an angle at least equal to μ=γ−α.

13. The device according to claim 12, wherein the radially outer planar dorsal face (18) forms, with each of the matching radially outer planar faces (20), an angle β at least equal to 1.5μ.

14. The device according to claim 12, wherein the center (C1, C2) of the first circular arc (15) is offset circumferentially with respect to the rotation axis toward the outside of the spring, with respect to the plane of the radially outer planar dorsal face (18), by a value d1.

15. The device according to claim 14, wherein a shortest distance (d2), from the radially outer planar dorsal face (18) of the seat to a part of a coaxial element (12) circumferentially facing the radially outer planar dorsal face (18), is between 0.2 mm and d/12.

16. The device according to claim 12, wherein each coaxial element comprises two edges, each one circumferentially facing a radially outer part of a seat (4, 6), which are configured so that each of the two seats (4, 6) is configured to pivot through an angle at least equal to μ, the pivoting of one of the seats being in a direction opposite to that of the other seat in order to allow bending of the spring (8) with radial outward displacement of a circumferentially central part of the spring in response to centrifugal forces.

17. The device according to claim 1, wherein each of the seats (4, 6) is made of steel or of plastic material, and comprises a central recess arranged in a frontal part thereof.

18. The device according to claim 1, wherein an axial length of the projection (14) is substantially equal to a distance between two outer radial faces belonging respectively to one and to the other of the two coaxial elements.

19. A friction clutch for a motor vehicle, comprising a torsion damping device, wherein the torsion damping device is according to claim 1.

20. A dual mass flywheel for a motor vehicle, comprising one flywheel provided to be integral with a driving shaft and one flywheel provided to be integral with a driven shaft, wherein the two flywheels are the two coaxial elements of a device according to claim 1.

21. A clutch for a motor vehicle, comprising a torsion damping device, wherein the torsion damping device is according to claim 1.

* * * * *